United States Patent [19]
Hepp et al.

[11] Patent Number: 5,564,368
[45] Date of Patent: Oct. 15, 1996

[54] CONTROL SYSTEM FOR A LIVESTOCK PEN PANEL

[75] Inventors: Kenneth R. Hepp, Oconomowoc; Daryl G. Benson, Iron Ridge; Judd G. Batterman, Sun Prairie; Jerry D. Ash, West Allis; Wilbert A. Rutz, Iron Ridge; Robert M. Downing, Horicon, all of Wis.

[73] Assignee: Gardner Barn Equipment Company, Inc., Juneau, Wis.

[21] Appl. No.: 316,894

[22] Filed: Oct. 3, 1994

[51] Int. Cl.⁶ .............................. A01K 1/06; A01K 1/08
[52] U.S. Cl. .............................. 119/740; 119/741
[58] Field of Search .................... 119/738, 739, 119/740, 741, 742, 744, 745, 746, 747, 750, 904

[56] References Cited

U.S. PATENT DOCUMENTS

| | | | |
|---|---|---|---|
| 4,185,592 | 1/1980 | Albers, Sr. | 119/740 |
| 4,457,265 | 7/1984 | Anderson | 119/750 |
| 5,289,798 | 3/1994 | Lock | 119/740 |
| 5,309,869 | 5/1994 | Albers, Jr. | 119/741 |

FOREIGN PATENT DOCUMENTS

| | | | |
|---|---|---|---|
| 2580464 | 10/1986 | France | 119/741 |
| 3326123 | 2/1985 | Germany | 119/741 |
| 4041882 | 7/1992 | Germany | 119/740 |

OTHER PUBLICATIONS

Gardner Barn Equipment Company, Inc. 1993 Catalog, p. 32.

*Primary Examiner*—Todd E. Manahan
*Attorney, Agent, or Firm*—Andrus, Sceales, Starke & Sawall

[57] ABSTRACT

A control system for use with a self-locking pen paneling arrangement includes a series of retaining bars which are movable from a first access position to a first retaining position in response to downward movement of an animal's neck toward the feeding area. A movable locking member is mounted to each retaining bar, and is engageable with a latch member when the retaining member is in its first retaining position. A release mechanism is operable to disengage the locking member from the latch member to provide movement of the retaining bar to its first access position. If desired, the retaining bar can be moved to a second retaining position, distinct from the first retaining position, in which movement of the release mechanism does not disengage the locking member from the latch member. This "locks out" certain animals to prevent withdrawal from the feeding area, to enable the operator to dehorn, vaccinate or perform any other procedure, treatment or operation on the animal as necessary. Thereafter, any animals which were previously "locked out" are released by further movement of the release mechanism. Any or all of the retaining members can also be moved to a second access position providing free access to and withdrawal from the feeding area.

20 Claims, 4 Drawing Sheets

CONTROL SYSTEM FOR A LIVESTOCK PEN PANEL

BACKGROUND AND SUMMARY OF THE INVENTION

This invention relates to an arrangement for selectively controlling access and withdrawal of livestock to and from a livestock feeding area.

An arrangement for controlling access and withdrawal of livestock to and from a livestock feeding area is known as a pen panel, which is commonly placed adjacent a feeding area. A pen panel typically includes top and bottom horizontal rails, with fixed, spaced vertical stiles extending therebetween. A movable retaining member, typically in the form of an elongated retaining bar, is mounted for pivoting movement at a predetermined location relative to each stile. In a self-locking pen panel, the retaining bar is movable from an access position to a retaining position in response to downward movement of the animal's neck toward the feeding area. Once the retaining bar is in its retaining position, the animal cannot withdraw from the feeding area due to engagement of the animal's head with the stile and the retaining member if the animal were to attempt to back out of the panel. It is known to provide a release mechanism which moves all of the retaining members in a predetermined length of the pen panel to their access positions after feeding is completed. Alternatively, the retaining members can be returned individually to their access positions so as to release some animals and retain others, such as dehorning, vaccination, tagging, breeding, pregnancy checks, trimming hooves, or medical treatment.

While the above-described system generally functions satisfactorily, it possesses certain drawbacks in operation which are somewhat of a nuisance to the operator. For example, the animals can individually be released while retaining others which are later individually released, or all animals can be released at once. In a long run of panelling, e.g. up to 100 stations, individually releasing some animals while retaining others can take a significant amount of time and effort. Further, the retaining bars are only movable between their retaining position and one access position, i.e. there is no capability for the retaining bar to be positioned so as to allow an animal free access to and withdrawal from the feeding area.

It is an object of the present invention to advance the state-of-the-art in livestock feeding control arrangements by providing a system which makes it easy for the operator to retain some animals while releasing others, and making it much easier to release the retained animals as a group when desired. It is a further object of the invention to provide a pen panel or the like in which the retaining bar can be positioned so as to provide free access to and withdrawal from the feeding area, as desired. It is a further object of the invention to provide a pen panel control system which is simple in its components and construction, yet which provides highly satisfactory operation.

In accordance with one aspect of the invention, a control system for a livestock feeding arrangement including a series of side-by-side feeding areas, consists of a retaining member movable between a first access position and a retaining position, with the retaining member in its access position enabling livestock to access the feeding area and in its retaining position preventing withdrawal of livestock from the feeding area. A locking arrangement is provided for each retaining member, consisting of a latch member and a movable locking member mounted to each retaining member. The latch member may be mounted in any satisfactory location, for example to the upper rail of the pen panel. The locking member is engaged with the latch member in a first locking position when the retaining member is in its retaining position for preventing movement of the retaining member to its first access position. A release mechanism is movable to a first release position to engage the locking member for disengaging the locking member from the latch member when the locking member is in its first locking position to enable movement of the retaining member to its first access position. The locking member is further engageable with the latch member in a second locking position distinct from the first locking position, in response to movement of the retaining member to a second retaining position. When the locking member is in its second locking position, the release mechanism in its first release position does not engage the locking member in order to maintain the retaining member in its second retaining position, to retain some animals in position and release others. The retaining member is preferably in the form of a retaining bar, which is movable from its first access position to its first retaining position in response to downward movement of the animal's neck toward the livestock feeding area. The locking member is mounted to the upper portion of the retaining bar, and is engageable with the latch member in the first locking position in response to movement of the retaining bar from its first access position to its first retaining position. The upper portion of the retaining bar includes a slot, and the locking member is preferably mounted for movement within the slot. The latch member includes a first recess within which the locking member is received when the locking member is engaged with the latch member in its first locking position, and a second recess, spaced laterally from the first recess, within which the locking member is received when the locking member is engaged with the latch member in its second locking position. The release mechanism includes a pivotable crank and a control bar movable in a back-and-forth longitudinal direction in response to pivoting operation of the crank. Release members are mounted to the control bar, and each release member includes first ramped structure for disengaging the locking member from the first recess by lifting the locking member out of the first recess in response to movement of the crank to a first rotational position, in which the release mechanism is placed in its first release position. Each release member further includes second ramped structure for disengaging the locking member from the second recess by lifting the locking member out of the second recess in response to movement of the crank to a second rotational position, in which the release mechanism is placed in its second release position. A shoulder is located adjacent each of the first and second ramped structures for engaging the locking member after withdrawal from the first and second recesses, respectively, to move the locking member laterally out of alignment with the recesses in response to movement of the control bar by operation of the crank. The first and second ramped structures are constructed such that entry of the locking member into the first recess is prevented during disengagement of the locking member from the second recess.

In accordance with another aspect of the invention, the retaining bar is selectively movable to a second access position, distinct from the first access position, which enables free access and withdrawal of livestock to and from the feeding area, without operation of the retaining feature as summarized above. In the second access position, the lower portion of the retaining bar is moved to a position in which it is not engaged by the animal's neck during its downward movement toward the livestock feeding area. In the second access position, the locking member is not engaged with the latch member at all. Rather, the retaining member is pivotably moved from its first access position, past its first and second locking positions such that the locking member passes over the latch member to position the retaining member in its second access position. The release mechanism includes a control bar which functions to selectively move the release members relative to the latch member.

Preferably, the locking member rests on the control bar in such a manner that the control bar can continue to be moved back and forth without moving the retaining member away from its second access position.

Preferably, the features summarized above are combined into a single system, to provide highly advantageous construction and operation. However, these features could be used individually if desired, and each would enhance operability of existing systems.

The invention further contemplates a method of moving all retaining members to their first access position from both their first and second locking positions, and a method of selectively providing free access to and withdrawal from the livestock feeding area, substantially in accordance with the foregoing summaries.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
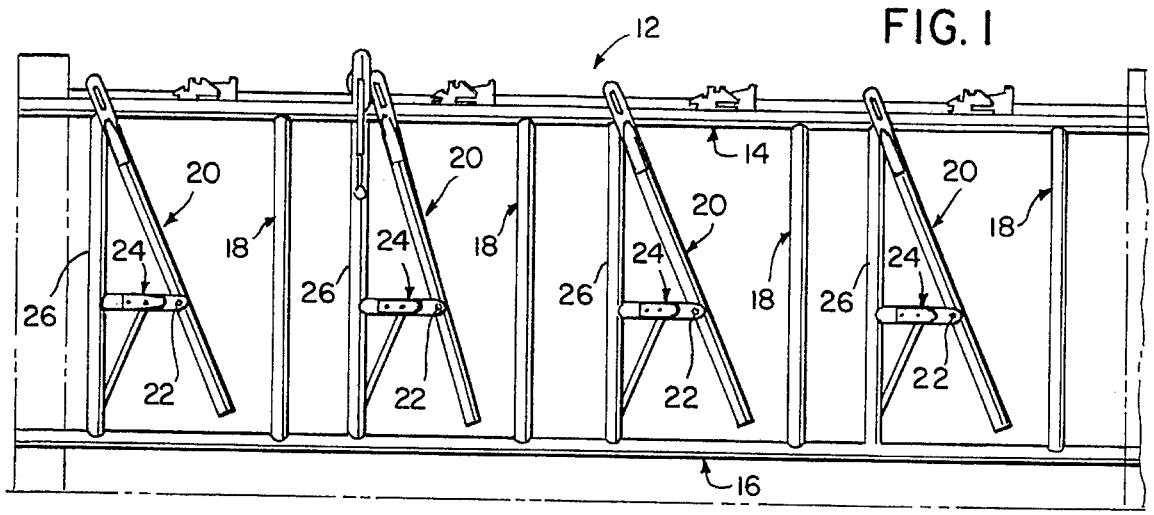
FIG. 1 is an elevation view of a pen paneling arrangement incorporating the locking, release and free access system of the invention.

Referring to FIG. 1, a self-locking pen panel 12 includes spaced, horizontal upper and lower rails 14, 16, respectively, with a series of vertical stiles 18 extending therebetween. Panel 12 is adapted for placement next to a feed trough or bunker, in a manner as is known.

A movable retainer bar 20 is spaced from each stile 18. Each retainer bar 20 is pivotably mounted via a bolt 22 to an arm assembly 24, which extends horizontally from a vertical support member 26 extending between upper rail 14 and lower rail 16. Each retainer bar 20 is movable between a first access position as shown in FIG. 1 and as shown in phantom in FIG. 2, and first and second retaining positions as shown in solid lines in FIG. 2.

Figure 3:
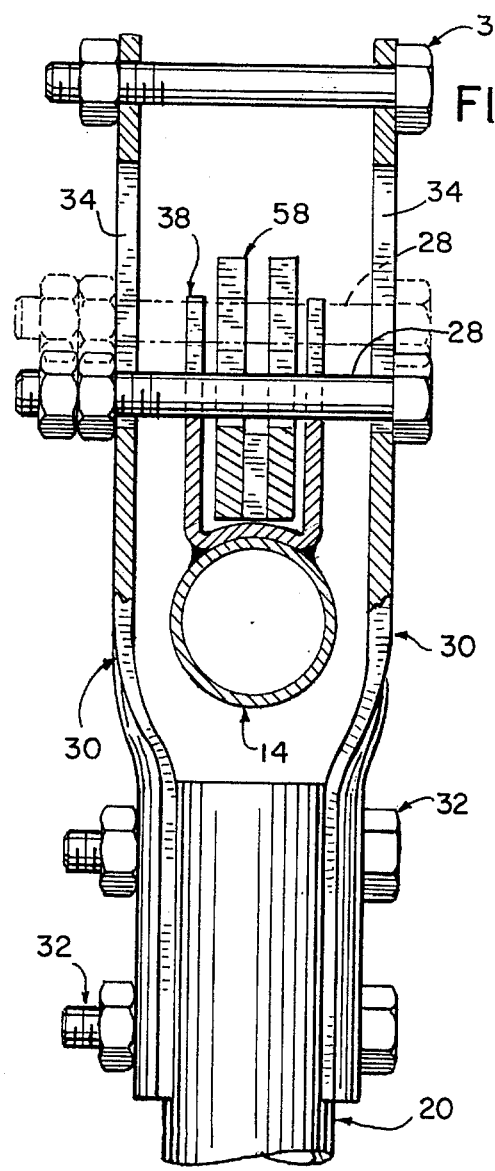
FIG. 3 is a partial section view taken along line 3—3 of FIG. 2.
Figure 2:
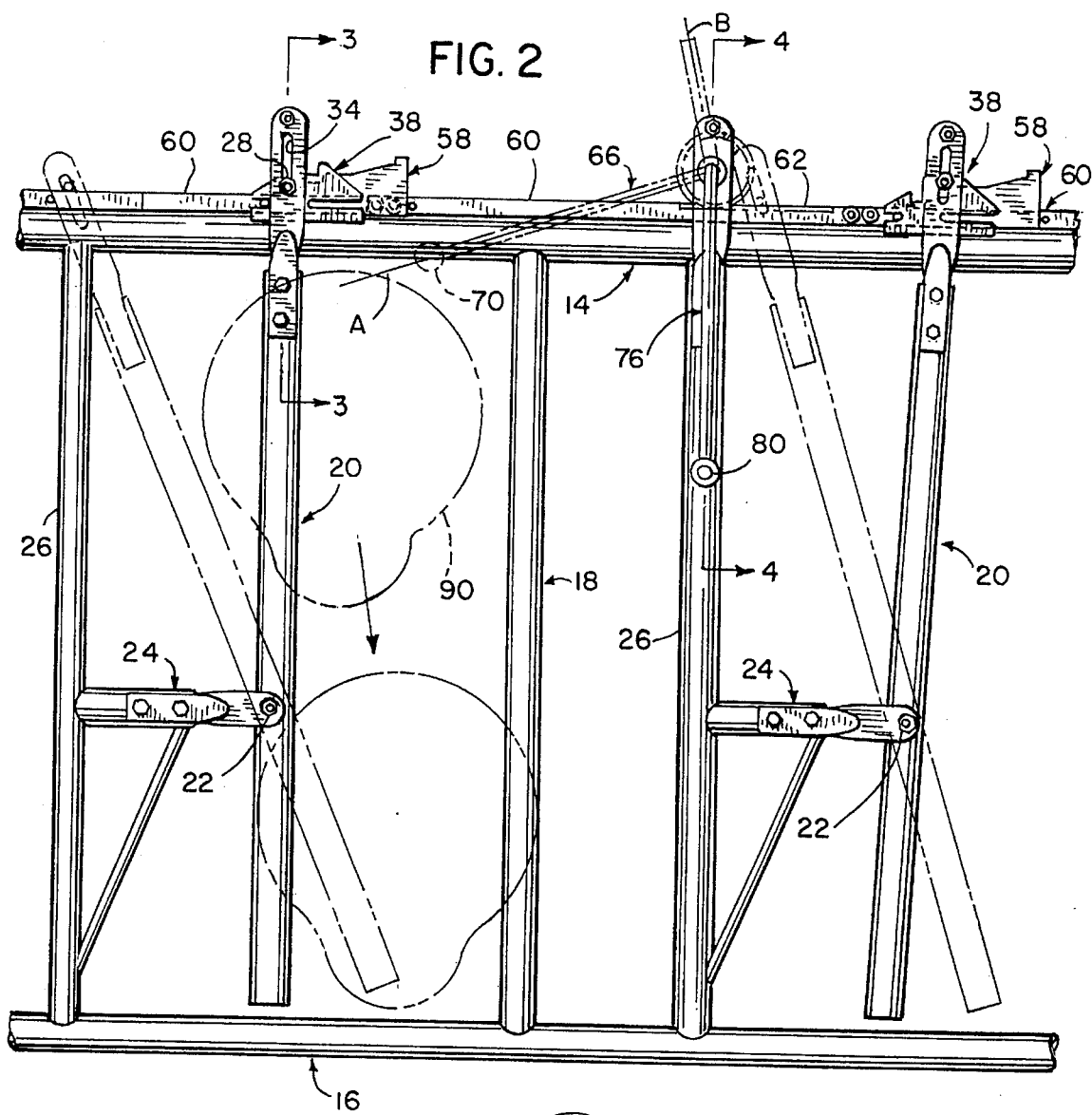
FIG. 2 is an enlarged elevation view of a portion of the pen panel arrangement of FIG. 1.
Figure 5:
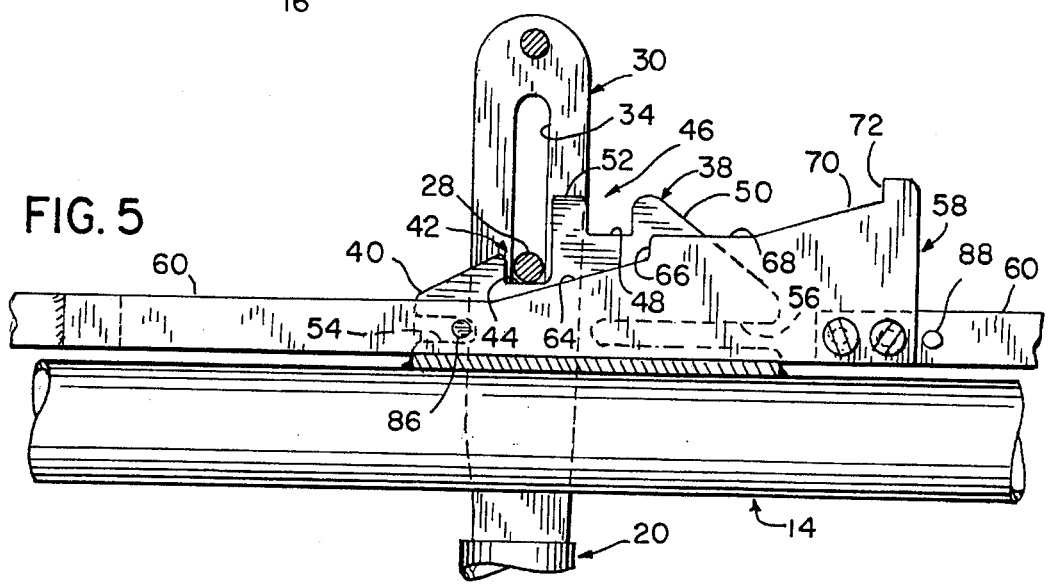
FIG. 5 is an enlarged partial elevation view showing the latch and release members of the pen panel of FIG. 1, with the locking member in its first locking position.

Referring to FIGS. 2, 3 and 5, a locking member, in the form of a locking pin 28, is movably mounted to the upper end of each retainer bar 20. A pair of arm extensions 30 extend upwardly from the upper end of retainer bar 20, and are secured to retainer bar 20 via nut and bolt assemblies 32. Each extension arm 30 defines a slot 34 extending along a longitudinal axis parallel to the longitudinal axis of retainer bar 20, and pin 28 extends between and through slots 34. Pin 28 is in the form of a bolt having a pair of nuts engaged with its threaded shank in a fixed position, providing free sliding movement of pin 28 within slots 34. Pin 28 is biased toward the lower ends of slots 34 by gravity. A nut and bolt assembly 36 extends between and interconnects the upper ends of extension arms 30.

A latch member 38 is fixed by welding or the like to the upper surface of upper rail 14. Latch member 38 includes a forward ramped surface 40, a first upwardly facing recess 42 defining a lower edge 44, a second upwardly facing recess 46 defining a lower edge 48, and a ramped rear surface 50. An intermediate section 52 separates first recess 42 and second recess 46.

Latch member 38 further includes a forwardly-opening slot 54 and a rearwardly-opening slot 56.

In a manner as will be explained, locking pin 28 is selectively engageable with either recess 42 or recess 46 for selectively maintaining retainer bar 20 in either a first retaining position or a second retaining position.

A release mechanism includes a series of release members 58 interconnected with each other by control bars 60. One of the control bars 60 includes a set of upwardly facing gear teeth 62, located over the connection of one of vertical support members 26 to upper rail 14.

Each release member 58 includes a forward ramped surface 64 terminating at a shoulder 66, a horizontal surface 68, and a rear ramped surface 70 terminating at a rear shoulder 72.

Figure 4:
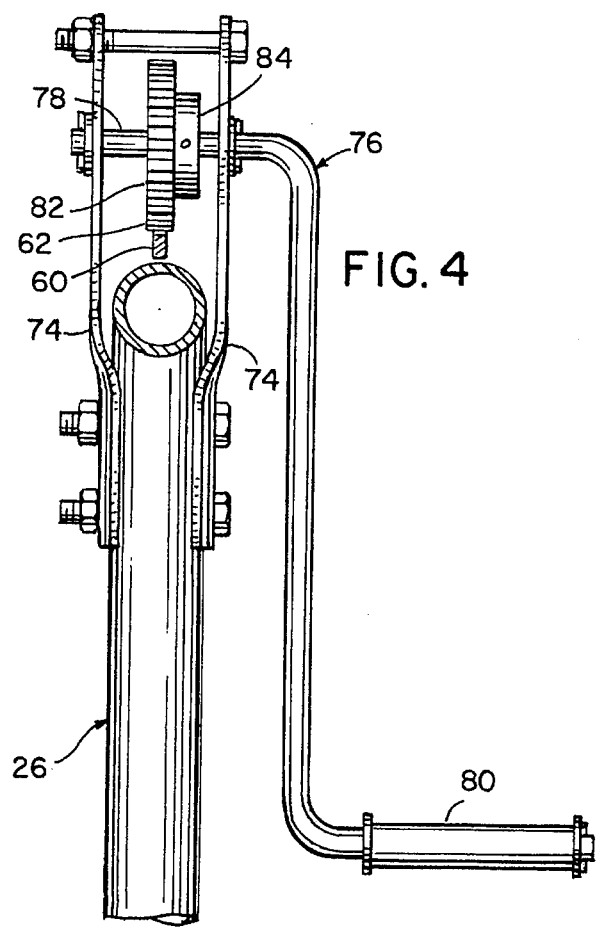
FIG. 4 is a partial section view taken along line 4—4 of FIG. 2.

A pair of extension arms 74 (FIG. 4) are mounted to vertical support member 26, such that control bar 60 is located between arms 74. A crank 76 includes an end shaft 78 extending between extension arms 74 and pivotably mounted within aligned openings formed therein. Crank 76 further includes a manually operable handle 80.

A gear 82 is nonrotatably fixed to crank end shaft 78 via a collar 84. Gear 82 includes outwardly facing teeth which engage gear teeth 62 formed on the upper surface of control bar 60.

With this arrangement, rotation of crank 76 results in movement of control bars 60 along their longitudinal axes, to selectively move release members 58, as will be explained.

Control bars 60 are supported above the upper surface of upper rail 14 by latch members 38. A front pin 86 (FIG. 5), mounted to each control bar 60, is engaged within front slot 54 formed in latch member 38 when release member 58 is in its FIG. 5 position. As release member 58 is moved forwardly, rear pins 88, which also function to secure the adjacent control bar 60 to release member 58, are received within rear slot 56 formed in latch member 38. This functions to retain control bars 60 and release members 58 above upper rail 14 at all times during forward and rearward movement of control bars 60 and release members 58.

Figure 6:
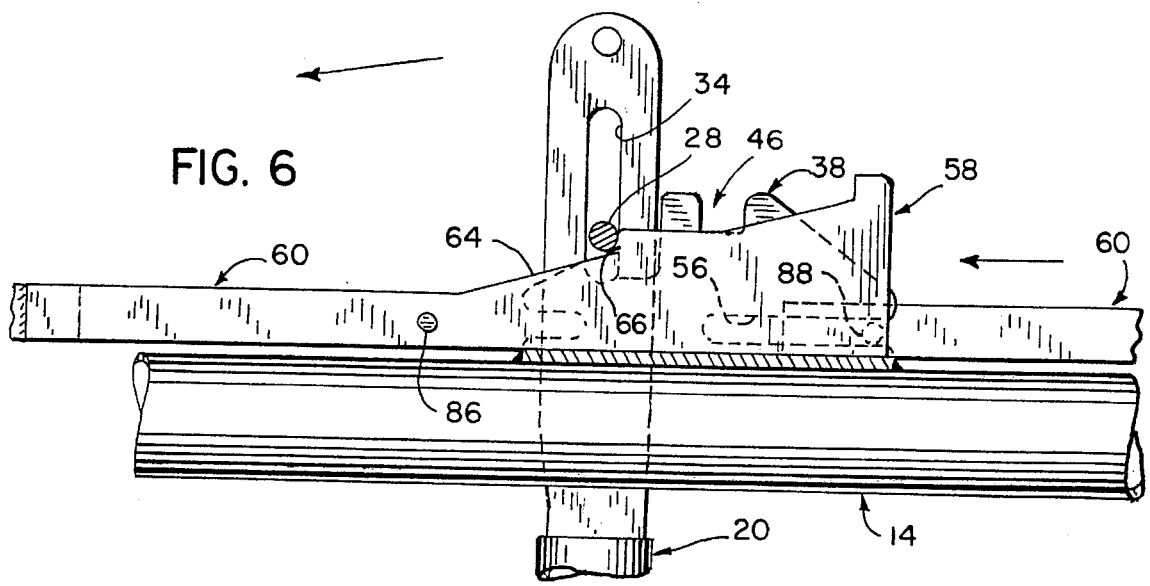
FIG. 6 is a view similar to FIG. 5, showing the release member moved to its first release position in which the locking member is disengaged from its first locking position of FIG. 5.

In operation, the above-described system functions as follows. Normally, retainer bars 20 are in their first access positions, as shown in phantom in FIG. 2. In this position, each retainer bar 20 is pivoted about pin 22 such that its lower end extends toward the adjacent stile 18 and its upper end is angled away therefrom, with locking pin 28 riding on the upper surface of control bar 60. When desired, feed is placed into the trough or other feeding structure adjacent to which panel 12 is located. The livestock then approach panel 12, with each animal inserting its head through the upper portion of the open area defined between retainer bar 20 and stile 18 when retainer bar 20 is in its first access position, as shown in phantom at 90 in FIG. 2. To eat, the animal moves its head and neck downwardly toward the trough or the like, such that the animal's neck engages the lower end of retainer bar 20 below pin 22, to pivot retainer bar 20 to a first retaining position as shown in FIG. 5 and the leftward portion of FIG. 2. During clockwise pivoting movement of retainer bar 20, locking pin 28 rides on control bar 60 and engages forward ramped surface 40 on latch member 38, until retainer bar 20 is pivoted to a substantially vertical position wherein locking pin 28 falls into first recess 42 and rests on its lower edge 44. This "self-locks" retainer bar 20 in its first retaining position, in which locking pin 28 remains within recess 42 to prevent movement of retainer bar 20 away from its vertical position to prevent withdrawal of the animal from the feeding area. When desired, the operator releases all animals held in place when retainer bars 20 are in their first retaining position by turning crank 68 in a clockwise direction (FIG. 2) to position A. Movement of crank 66 to position A moves each release member 58 from its home position of FIG. 5 to its first release position of FIG. 6. During such movement, forward ramp 64 of retaining member 58 engages locking pin 28 to lift locking pin 28 out of recess 42, and shoulder 66 engages locking pin 28 after it has been lifted out of recess 42 to move locking pin 28 laterally out of alignment with recess 42, as shown in FIG. 6. Once locking pin 28 is in its FIG. 6 position, retainer bar 20 is no longer vertical, and falls by its own weight back to its first access position once the animal's neck is moved out of engagement with retainer bar 20. During such movement of retainer bar 20, locking pin 28 rides on ramp 64 and the upper surface of control bar 60.

Figure 7:
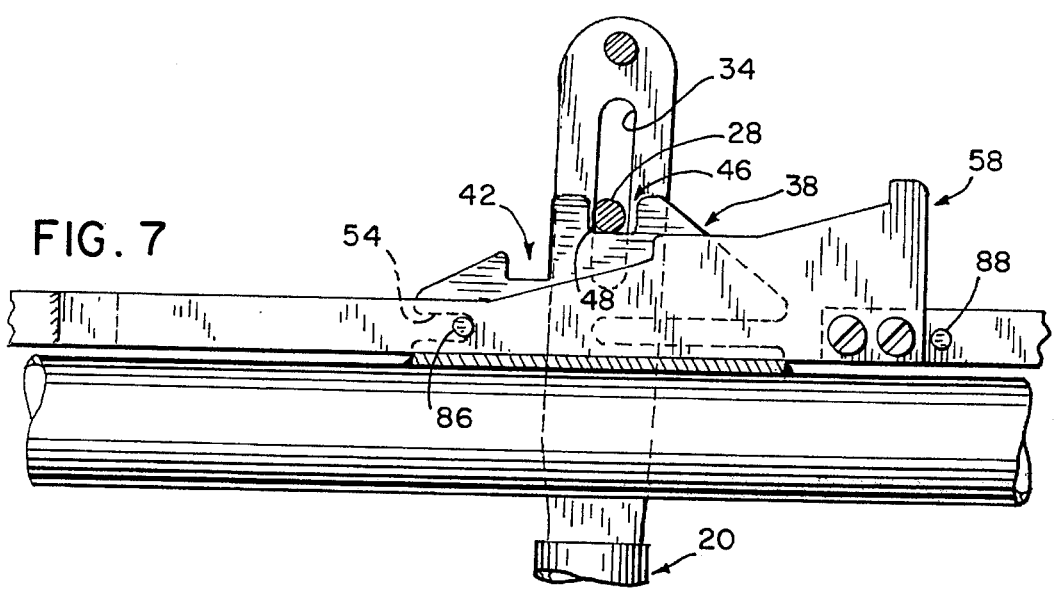
FIG. 7 is a view similar to FIGS. 5 and 6, showing the locking member in its second locking position.
Figure 8:
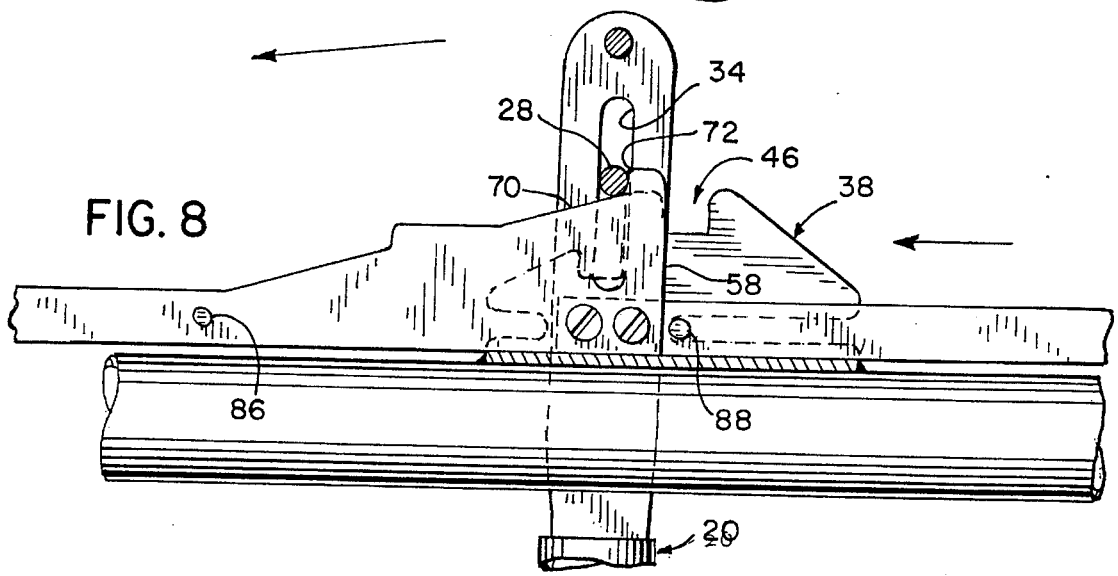
FIG. 8 is a view similar to FIGS. 5–7, showing the release member moved to its second release position in which the locking member is disengaged from its second locking position of FIG. 7.

While the animals are eating, the operator can selectively lock out certain animals to prevent certain of retainer bars 20 from being disengaged with latch member 38 when release members 58 are moved to their FIG. 6 position. To accomplish this, the operator manually moves retainer bar 20 to its second retaining position, as shown in FIG. 7. In this position, locking pin 28 is received within second recess 46 of latch member 38 and rests on its lower edge 48. In this position, retainer bar 20 is slightly off-vertical such that its upper portion is angled toward the adjacent stile 18. When crank 66 is moved to its position A, release member 58 slides below pin 28 and lower edge 48 of recess 46, without engaging pin 28. Thus, any retainer bars 20 which are not in their second retaining position of FIG. 7 are released, while those in their FIG. 7 position remain in engagement with latch member 38. The animals which are continued to be held in place after withdrawal of the remaining animals can then be dehorned, vaccinated, tagged or otherwise treated or attend to, as desired. When completed, the operator can then release all of the animals which were originally "locked out" by moving crank 66 to position B (FIG. 2). This results in further leftward sliding movement of control bars 60 to move release members 58 to their second release position of FIG. 8. During such movement of release members 58, locking pins 28 ride on ramped surface 70, which functions to raise locking pin 28 upwardly out of recess 46. Once locking pin 28 has been raised above the upper edge of intermediate section 52, shoulder 72 engages locking pin 28 to move locking pin 28 out of alignment with recess 46. Retainer bar 20 then slides along ramp 70, horizontal edge 68, ramp 64 and the upper surface of control bar 60 during movement of retainer bar 20 back to its first access position.

As noted previously, during movement of control bars 60 and release members 58, pins 86, 88 remain alternately in engagement with latch member slots 54, 56, respectively, to support control bars 60 and release members 58 for sliding reciprocable movement above upper rail 14.

Figure 9:
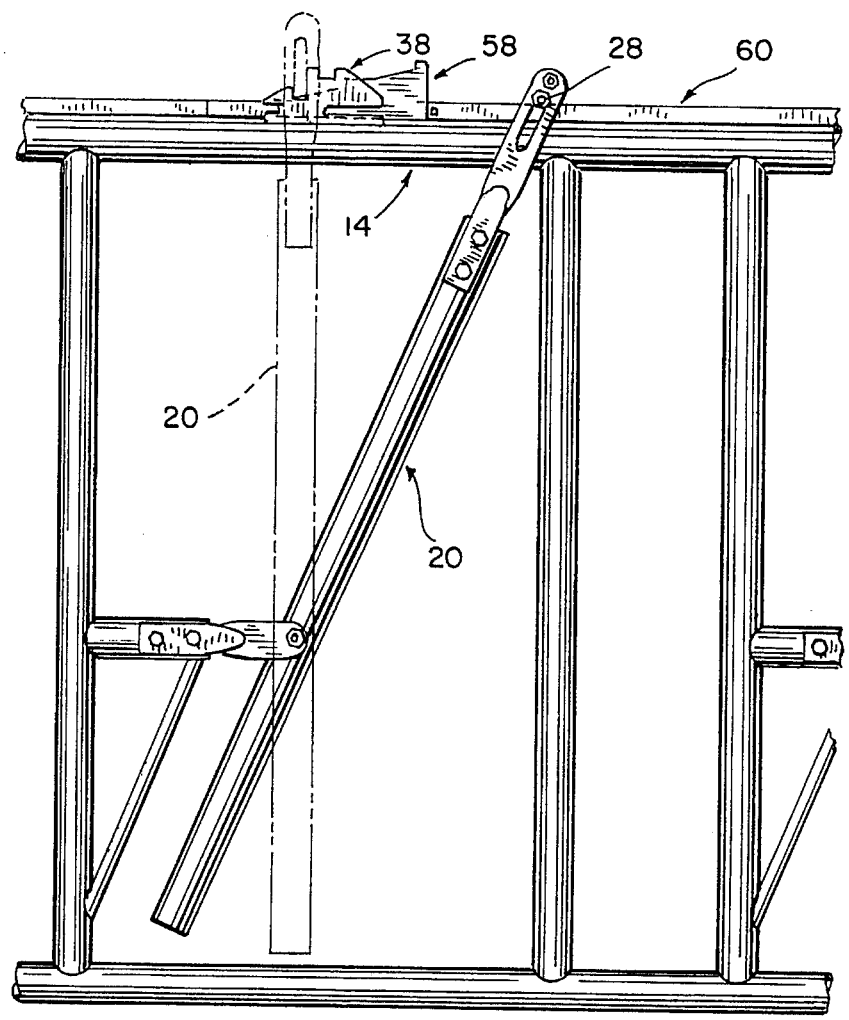
FIG. 9 is a partial elevation view similar to FIG. 2, showing the retaining member moved to its second, free access position.

Referring to FIG. 9, each retainer bar 20 can selectively be moved to a second access position, shown in solid lines, which provides the livestock free access to and withdrawal from the feeding area. Each retainer bar 20 is moved to its second access position manually by the operator, by lifting locking pin 28 upwardly to the upper extent of slots 34 and pivoting retainer bar 20 in a clockwise direction. During such pivoting movement of retainer bar 20, locking pin 28 clears latch member 38, thereafter engaging the upper surface of control bar 60. With this arrangement, selected retainer bars 20 can be moved to their free access position regardless of the position of the other retainer bars, and without affecting operation of the remaining retainer bars 20 or the movement of control bars 60 and release member 58.

It should be understood that any of retainer bars 20 can be manually moved to either their first or second access positions at any time from either retaining position, as desired by the operator.

Figure 10:
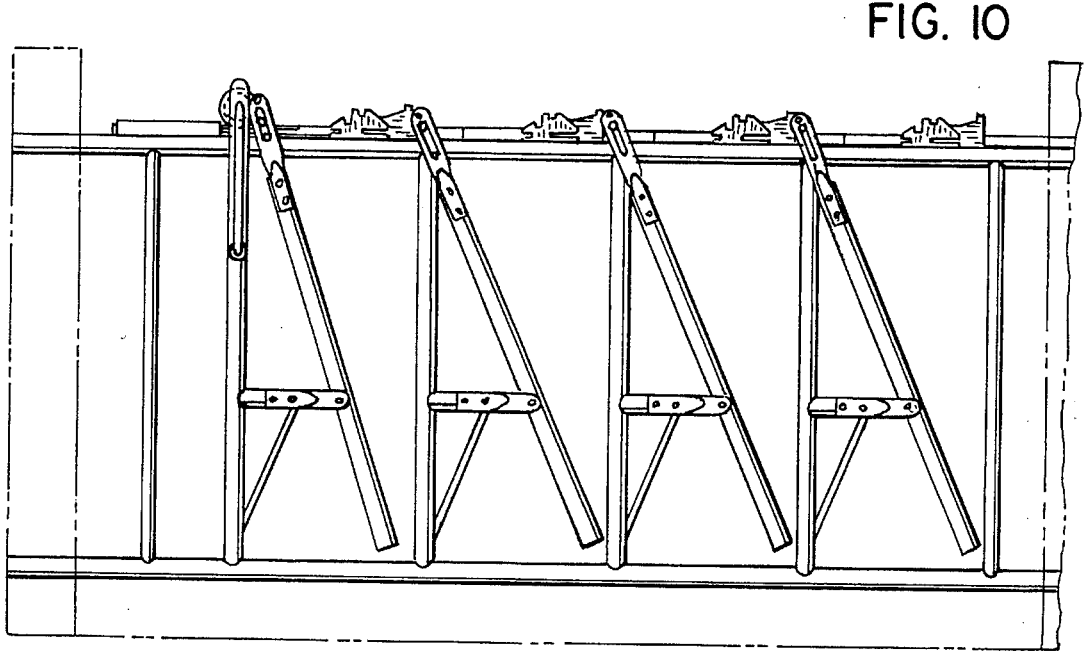
FIG. 10 is a view similar to FIG. 1, showing another embodiment of the pen panel incorporating the features of the invention.

FIG. 10 illustrates an alternative embodiment in which the adjacent stiles and control members are placed closer together than illustrated in FIG. 1, to show applicability of the present invention to a system for use with young livestock.

It should be appreciated that the crank-type release system of the present invention enables a user to provide a long length of adjacent openings for accessing a feeding area while requiring only a single actuator mechanism to control release of the livestock therefrom. The two-stage release system for first releasing all animals not "locked out", and for thereafter releasing all animals which are "locked out", provides the operator a significant operating advantage by not having to manually disengage any of the retaining bars. As can also be appreciated, however, any of the retaining bars can selectively be moved by the operator to their first or second access position at any time to selectively release individual animals without having to release an entire group.

Various alternatives and embodiments are contemplated as being within the scope of the following claims particularly pointing out and distinctly claiming the subject matter regarded as the invention.

We claim:

1. A control system for a livestock feeding arrangement including a series of side-by-side feeding areas, for selectively controlling access and withdrawal of livestock to and from each feeding area, comprising:

a retaining member movable between a first access position and a retaining position, wherein the retaining member in its access position enables the livestock to access the feeding area and in its retaining position prevents withdrawal of livestock from the feeding area;

a locking arrangement for each retaining member, comprising a movable locking member mounted to each retaining member and a latch member, wherein the locking member is engaged with the latch member in a first locking position when the retaining member is in its retaining position for preventing movement of the retaining member to its first access position;

a release mechanism engageable with the locking member for disengaging the locking member from the latch member when the locking member is in its first locking position to enable movement of the retaining member to its first access position; and wherein the locking member is engageable with the latch member in a second locking position distinct from the first locking position to prevent engagement of the release mechanism with the locking member to selectively prevent withdrawal of livestock from the feeding area.

2. The control system of claim 1, wherein the retaining member comprises a retaining bar defining an upper portion and a lower portion, and wherein the retaining bar is movable from its first access position to its retaining position by engagement of the neck of an animal with the retaining bar lower portion during downward movement of the animal's neck toward the livestock feeding area, and wherein the movable locking member is mounted to the upper portion of the retaining bar and is engageable with the latch member in the first locking position in response to movement of the retaining bar from its first access position to its retaining position.

3. The control system of claim 2, wherein the upper portion of the retaining bar includes a slot, and wherein the locking member is mounted for movement within the slot.

4. The control system of claim 2, wherein the latch member includes a first recess within which the locking member is received when the locking member is engaged with the latch member in its first locking position, and a second recess spaced laterally from the first recess within which the locking member is received when the locking member is engaged with the latch member in its second locking position.

5. The control system of claim 4, wherein the release mechanism comprises a pivotable crank, a control bar movable in a back-and-forth longitudinal direction in response to pivoting operation of the crank, and a release member including a first ramped structure for disengaging the locking member from the first recess by lifting the locking member out of the first recess in response to movement of the crank to a first rotational position.

6. The control system of claim 5, further comprising a shoulder adjacent the first ramped structure for engaging the locking member to move the locking member laterally out of alignment with the first recess in response to movement of the control bar by pivoting operation of the crank.

7. The control system of claim 5, wherein the release member further includes a second ramped structure for disengaging the locking member from the second recess by lifting the locking member out of the second recess in response to movement of the crank to a second rotational position.

8. The control system of claim 7, further comprising a shoulder adjacent the second ramped structure for engaging the locking member to move the locking member laterally out of alignment with the second recess in response to movement of the control bar by pivoting operation of the crank.

9. The control system of claim 7, wherein the release member first and second ramped structures are constructed such that entry of the locking member into the first recess is prevented during disengagement of the locking member from the second recess.

10. The control system of claim 2, wherein the retaining bar is movable to a second access position in which the locking member is moved out of engagement with the latch member and the retaining member is positioned such that the retaining member lower portion is not engaged by the animal's neck during downward movement toward the feeding area, and wherein the release mechanism is not operable on the locking member.

11. In a control system for a livestock feeding arrangement including a series of side-by-side feeding areas, for selectively controlling access and withdrawal of livestock to and from each feeding area, including a pivoting retaining member movable between a first access position and a retaining position in response to downward movement of the animal's neck toward the feeding area, the improvement comprising:

a locking arrangement for each retaining member comprising a locking pin mounted to the retaining member and engageable with a latch member in a first position when the retaining member is in it's retaining position for preventing movement of the retaining member to its first access position;

the locking pin being engageable with the latch member in a second position distinct from the first position to prevent movement of the retaining member to its first access position; and a release mechanism engageable with the locking pin and movable to a first release position for disengaging the locking pin from the latch member when the locking pin is engaged with the latch member in its first locking position to enable movement of the retaining member to its first access position, whereby the retaining members with locking pins engaged with the latch members in the second locking position remain in the retaining position to prevent withdrawal of the animal from the feeding area, and to a second release position distinct from the first release position for disengaging the locking pin from the latch member when the locking pin is engaged with the latch member in its second position to enable movement of the retaining members to their first access position.

12. A method of controlling livestock access and withdrawal to and from a livestock feeding area, comprising the steps of:

movably mounting a series of retaining members adjacent the livestock feeding area, each retaining member being movable between an access position and first and second retaining positions, each retaining member being movable to its first retaining position in response to downward movement of the animal's neck toward the livestock feeding area;

moving one or more of the retaining members to the second retaining position for animals to be retained at the feeding area;

moving a release mechanism to a first release position to release the retaining members in the first retaining position to provide withdrawal of a first group of one or more animals from the livestock feeding area while preventing withdrawal of a second group of one or more animals from the livestock feeding area; and moving the release mechanism to a second release position distinct from the first release position to release the retaining members in the second retaining position to provide withdrawal of the second group of one or more animals from the livestock feeding area.

13. A control system for a livestock feeding arrangement including a series of side-by-side feeding areas, for selectively controlling access and withdrawal of livestock to and from each feeding area, comprising:

a retaining member movable between a first access position and a retaining position, wherein the retaining member in its first access position enables the livestock to access the feeding area and in its retaining position prevents withdrawal of livestock from the feeding area;

a latch arrangement for selectively maintaining the retaining member in its retaining position, including a latch member and a locking member movably mounted to the retaining member, wherein the locking member is removably engageable with the latch member;

a release mechanism including a release member for selectively disengaging the locking member from the latch member to provide movement of the retaining member from its retaining position to its first access position; and wherein the retaining member is movable to a second access position distinct from the first access position by moving the locking member to a position relative to the retaining member which enables the locking member to clear the release member during movement of the retaining member to its second access position.

14. The control system of claim 13, wherein the retaining member comprises a retaining bar defining an upper portion and a lower portion, and wherein the retaining bar is pivotably movable in a first rotational direction from its first access position to its retaining position by engagement of the neck of an animal with the retaining bar lower portion during downward movement of the animal's neck toward the livestock feeding area, and wherein the retaining bar is movable to its second access position by continued manual movement of the retaining member in the first rotational direction past the latch arrangement.

15. The control system of claim 14, wherein the upper portion of the retaining bar includes a slot, and wherein the locking member is mounted for movement within the slot and selectively engageable with the latch member for selectively maintaining the retaining member in its retaining position, wherein the locking member is capable of being positioned within the slot so as to clear the latch member during pivoting movement of the retaining bar in the first rotational direction to its second access position.

16. The control system of claim 15, wherein the release member is mounted adjacent the latch member for selectively disengaging the locking member from the latch member when the retaining bar is in its retaining position, and wherein the locking member is capable of being positioned within the slot so as to clear the release member during pivoting movement of the retaining bar to its second access position.

17. The control system of claim 16, wherein the release mechanism further includes a control bar interconnected with the release member and a manually operable crank for selectively imparting longitudinal movement to the control bar in response thereto to control the position of the release member, and wherein the locking member is engaged with the control bar when the retaining member is in its second access position.

18. A method of selectively providing free access of livestock to a livestock feeding area, comprising the steps of:

movably mounting a series of retaining members adjacent the livestock feeding area, each retaining member being movable between a first access position and a retaining position, each retaining member being movable to its retaining position in response to downward movement of the animal's neck toward the feeding area;

providing a stationary latch mechanism and a movable release mechanism, wherein the retaining member is engageable with the latch mechanism for selectively maintaining the retaining member in its retaining position, and wherein the release mechanism includes a release member for selectively disengaging the retaining member from the latch mechanism to provide movement of the retaining member from its retaining position to its first access position; and selectively moving the retaining member past the latch mechanism and the release mechanism to a second access position, distinct from the first access position, in which the retaining member is moved out of engagement with the latch member and the release mechanism.

19. The method of claim 18, wherein each retaining member is pivotably movable in a first rotational direction between its first access position and its retaining position, and wherein the retaining member is further movable in the first rotational direction past the latch member and the release mechanism to its second access position.

20. The method of claim 19, wherein the retaining member defines an upper portion and a lower portion, wherein the retaining member lower portion is engaged by the animal's neck during downward movement of the animal's neck toward the livestock feeding area when the retaining member is in its first access position, and wherein the retaining member in its second access position is positioned such that the retaining member lower portion is not engaged by the animal's neck during downward movement of the animal's neck toward the livestock feeding area.

* * * * *